United States Patent
Adams et al.

(10) Patent No.: US 7,484,429 B2
(45) Date of Patent: *Feb. 3, 2009

(54) CLOSED LOOP ADAPTIVE FLUID CONTROL SYSTEM AND METHOD

(75) Inventors: Scott D. Adams, Portage, MI (US); David E. Herbert, Rochester Hills, MI (US); Greg E. Ford, Detroit, MI (US); Peter M. Jacobsen, Oakland Township, MI (US); Harold L. Bowman, Lapeer, MI (US); Timothy J. Green, Holly, MI (US)

(73) Assignee: Eaton Corporation, Cleveland, OH (US)

( * ) Notice: Subject to any disclaimer, the term of this patent is extended or adjusted under 35 U.S.C. 154(b) by 239 days.

This patent is subject to a terminal disclaimer.

(21) Appl. No.: 11/414,447

(22) Filed: Apr. 28, 2006
(Under 37 CFR 1.47)

(65) Prior Publication Data
US 2006/0293147 A1    Dec. 28, 2006

Related U.S. Application Data

(60) Provisional application No. 60/679,519, filed on May 10, 2005.

(51) Int. Cl.
*F16H 59/00*    (2006.01)
(52) U.S. Cl. .................................................. 74/335
(58) Field of Classification Search ............. 192/30 W, 192/3.58, 85 R
See application file for complete search history.

(56) References Cited

U.S. PATENT DOCUMENTS

| | | | |
|---|---|---|---|
| 4,611,285 A | 9/1986 | Weisman, II | |
| 4,776,233 A | 10/1988 | Kita | |
| 4,781,080 A * | 11/1988 | Iwatsuki | 477/161 |
| 4,791,568 A | 12/1988 | Hiramatsu | |
| 4,919,012 A | 4/1990 | Bolz | |
| 4,956,776 A | 9/1990 | Carre | |
| 5,024,638 A | 6/1991 | Sakakibara | |
| 5,062,050 A | 10/1991 | Petzold | |
| 5,318,159 A * | 6/1994 | Kashiwabara | 477/169 |
| 5,899,829 A | 5/1999 | Salecker | |
| 6,341,552 B1 * | 1/2002 | Potter et al. | 91/433 |
| 6,807,472 B2 * | 10/2004 | Ford et al. | 701/58 |
| 7,194,349 B2 * | 3/2007 | Surianarayanan et al. | 701/60 |

* cited by examiner

*Primary Examiner*—Dirk Wright
(74) *Attorney, Agent, or Firm*—Anna M. Shih

(57) ABSTRACT

A closed loop adaptive fluid control system and method for use in hydraulic applications monitors one or more fluid characteristics, such as pressure, flow rate, accumulation time in an actuator, fill volume, etc., and compares the characteristic with a target response. A fluid characteristic sensor detects at least one fluid characteristic at a hydraulically-actuated device that is actuated by a electrically-operated. The sensor sends a device signal corresponding to the actual sensed characteristic to an electronic controller, which compares the device signal with a target response. The controller then identifies any differences between the device signal and the target response and provides a feedback signal to the electrically-operated valve to adjust the current to the valve, which in turn adjusts the electrically-operated valve so that the device signal corresponding to the sensed characteristic at the device converges toward the target response.

17 Claims, 3 Drawing Sheets

CLOSED LOOP ADAPTIVE FLUID CONTROL SYSTEM AND METHOD

RELATED APPLICATIONS

This application claims the benefit of U.S. Provisional Application No. 60/679,519, filed May 10, 2005 entitled "Closed Loop Control of Shifting Clutch Actuators in an Automatic Speed Change Transmission", which is incorporated herein by reference in its entirety.

TECHNICAL FIELD

The present invention relates to control of fluid behavior in a hydraulic system, and more particularly to a system that conducts closed loop control of fluid by monitoring and controlling at least one fluid characteristic in substantially real time.

BACKGROUND OF THE INVENTION

Hydraulic systems include solenoid operated valves that control the flow of pressurized fluid to hydraulically-actuated devices. In these systems, a pilot valve, such as a proportional solenoid valve, controls flow to a large flow control valve for actuation of the control valve. Electronically-controlled solenoid valves tend to provide smoother operation within the hydraulic system when compared to hydro-mechanical shift controls; for example, when used in transmission systems, solenoid valves permit staged or progressive release and application of the clutches (e.g., band clutches or plate clutches) for smoother speed changes.

The electrically-operated valve may be controlled by an electronic controller that controls an operational characteristic, such as line pressure, at the device. For example, the controller may send a signal to the electrically-operated to regulate the supply pressure to the valve, which acts as a primary regulator valve that controls the hydraulically-actuated device. Many applications require the device to change operation frequently, rapidly and precisely (e.g., to handle vehicle speed changes, in the case of a transmission), which in turn requires a high degree of calibration of the electrically-operated controlling the pressure to the device. This level of calibration has been difficult to achieve in practice.

Moreover, control of the electrically-operated, and therefore the device operation, is conducted via an algorithm in the electronic controller using a known calibration curve for the valves. This curve theoretically ensures the desired fluid characteristic response at the hydraulically-actuated device based on the current input to the electrically-operated. In practice, however, maintaining the calibration of the electrically-operated valve to accurately control of the output pressure to the shift actuators is difficult because the output pressure of the valve, which controls the output characteristics of the device, changes as the valve deteriorates or as operating conditions such as temperature, fluid viscosity, and fluid contamination changes. In other words, currently known systems only operate according to a fixed valve calibration and cannot adapt to changing systems or even variations among the valves. Thus, even with tight manufacturing tolerances of the valves and devices, the actual There is a desire for a system and method that allows closed loop adaptive control of a hydraulic system in real time so that the valve is controlled based on comparing the actual operation of the hydraulically-actuated device with a desired target operation rather than a rigid, predetermined calibration curve of the valve.

BRIEF SUMMARY OF THE INVENTION

The present invention is directed to a closed loop adaptive fluid control system and method for use in hydraulic applications. The system monitors one or more fluid characteristics, such as pressure, flow rate, accumulation time in an actuator, fill volume, etc., and compares the characteristic with a target response. The closed loop system then adapts the system response so that the actual fluid characteristic converges toward a target response. This target response does not need to be a static value; the adaptive functionality of the invention allows the fluid characteristic to be easily controlled so that can converge toward a varying target response as well.

In one embodiment, a fluid characteristic sensor detects at least one fluid characteristic at a hydraulically-actuated device that is actuated by an electrically-operated valve. The sensor sends a device signal corresponding to the actual sensed characteristic at the device to an electronic controller, which compares the device signal with a target response. The controller then identifies any differences between the device signal and the target response and provides a feedback signal to the electrically-operated to adjust the current to the solenoid, which in turn adjusts the fluid sent to the hydraulically-actuated device so that the device signal corresponding to sensed characteristic converges toward the target response. As the electrically-operated changes operation of the device based on the feedback signal, the device operation will constantly move toward or meet its desired target response.

By monitoring and adjusting the output of the hydraulically-actuated device in real time, the invention ensures that the device will have the desired response even if the target response varies. The closed loop control also continuously adapts the operation of the electrically-operated so that the device's actual response will converge toward the target response regardless of the condition of the device; as a result, the invention automatically adapts to changes in the entire system caused by age, deterioration, changing operating conditions, fluid viscosity changes, and other factors. As a result, the present invention provides more accurate control over the operation of the hydraulically-actuated device, thereby improving the ability for the device to operate smoothly and maintain pressure accuracy regardless of the system operating conditions, the characteristics of the device and valve itself, and the target response.

DETAILED DESCRIPTION OF THE INVENTION

The inventive system generally focuses on conducting closed loop, real-time control of a fluid characteristic in one or more hydraulically-actuated devices. The system may be, for example, a vehicle transmission system that conducts electrically-operated control flow of pressurized fluid to hydraulically-actuated devices (e.g., transmission shift actuators) during the transmission shifting operation. Note that this system can be used in any type of transmission (e.g., manual, automatic, dual clutch, automated manual, etc.). The fluid characteristic that is monitored and controlled can be any characteristic affecting operation of the hydraulically-actuated device. Possible fluid characteristics to be controlled include fluid pressure, flow rate, accumulation time, fill volume, etc. For simplicity and explanatory purposes only, the description below will focus on real-time control of fluid pressure in a vehicle transmission system (manual, automatic, dual clutch, torque converter, etc.), but those of ordinary skill in the art will understand that the system can control other characteristics and can also monitor and control multiple characteristics at the same time without departing from the scope of the invention.

Figure 1:
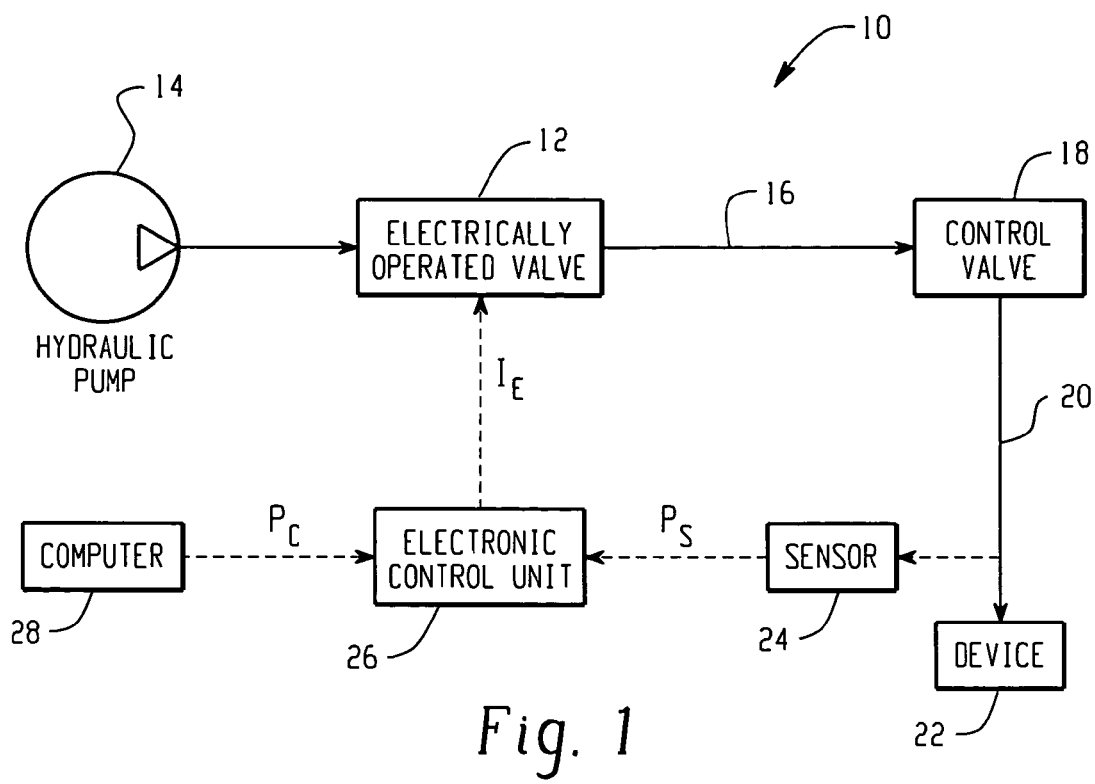
FIG. 1 is a block diagram illustrating a closed loop adaptive fluid pressure control system according to one embodiment of the invention.

Referring to FIG. 1, a first embodiment of the inventive system 10 is shown with an electrically-operated control valve 12 supplied with pressurized hydraulic fluid from pump 14. The control valve 12 can be any electrically-operated valve, such as a solenoid valve, piezoelectric valve, differential valve, etc. In a transmission application, the pump 14 may be driven by the transmission input shaft, for example. The valve 12 supplies pressurized fluid along conduit 16 to a hydraulic control valve 18, the output of which is applied through conduit 20 to a hydraulically-actuated device 22. If the inventive system 10 is used in a transmission application, the hydraulically actuated device 22 may be, as for example, a multi-plate clutch or band clutch, for controlling torque transmission upon a gear change. Those of ordinary skill in the art will understand that other hydraulically-actuated devices 22 may be used in other applications without departing from the scope of the invention.

A fluid characteristic, such as pressure, flow rate, accumulation time in an actuator, fill volume, etc. of the fluid supplied to the device 22 along the conduit 20 is sensed by a sensor 24. Note that although the examples below focus on measurement of fluid pressure, any other fluid characteristic may be measured and used for adaptive control without departing from the scope of the invention. In a transmission application, the sensor 24 may comprise a piezoresistive or similar proportional pressure sensor. The sensor 24 in turn provides an electrical signal $P_s$ corresponding to the sensed pressure, as shown by the dashed line in FIG. 1, to an electronic control unit 26. The control unit 26 also receives a command pressure signal $P_c$ from a remote computer 28, which is programmed to provide the desired pressure profile of the control valve 18.

As will be described in greater detail below, the closed loop configuration of the system 10 provides real time pressure control by determining the difference between the command pressure signal $P_c$ and the sensed pressure $P_s$ and then adjusting a profile of a signal sent to the electrically-operated control valve 12 based on this difference to minimize the pressure difference in real time. In this example, the system adjusts a current profile $I_E$, but the control unit 26 may adjust a voltage profile without departing from the scope of the invention. This adjustment is repeated until the sensed pressure profile $P_s$ matches the desired pressure profile $P_s$.

Note that the command pressure signal $P_c$, which reflects the ideal pressure characteristic of the hydraulic control valve 18, does not need to be a static value. Instead, it can be variable over time based on, for example, operating conditions, customer requirements, or other factors. In other words, the command pressure signal $P_c$ can be a function that varies over time. Because the system 10 is a closed loop iterative system, the control unit 26 algorithm iterates to a convergent solution (i.e., controls the current $I_E$ so that $\Delta P = P_c - P_s$ approaches zero) regardless of the characteristics of the command pressure signal $P_c$ itself.

Figure 2:
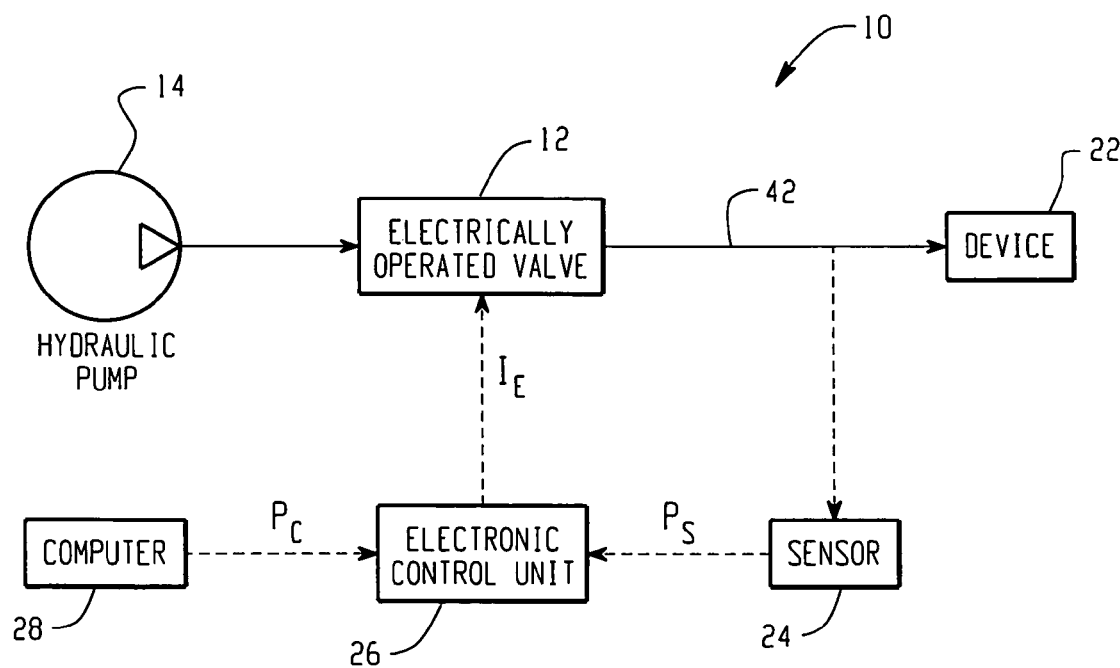
FIG. 2 is a block diagram illustrating a closed loop adaptive fluid pressure control system according to another embodiment of the invention.

FIG. 2 shows another embodiment of the inventive closed loop system 10. In this embodiment, the sensor 24 still measures the pressure being supplied to the hydraulically actuated device 22, but this example eliminates the hydraulic control valve and controls the device 22 directly via the electrically-operated control valve 12 instead of through a separate hydraulic control valve. The difference between the sensed pressure and the command pressure signal is calculated in the same manner as described above, and the current $I_E$ sent to the control valve 12 based on the difference $\Delta P$ is also adjusted in the same manner as described above. As can be seen in FIGS. 1 and 2, the closed loop system 10 is flexible enough to conduct iterative pressure control for any system, even simpler ones with fewer components, that require fluid pressure regulation.

Figure 3:
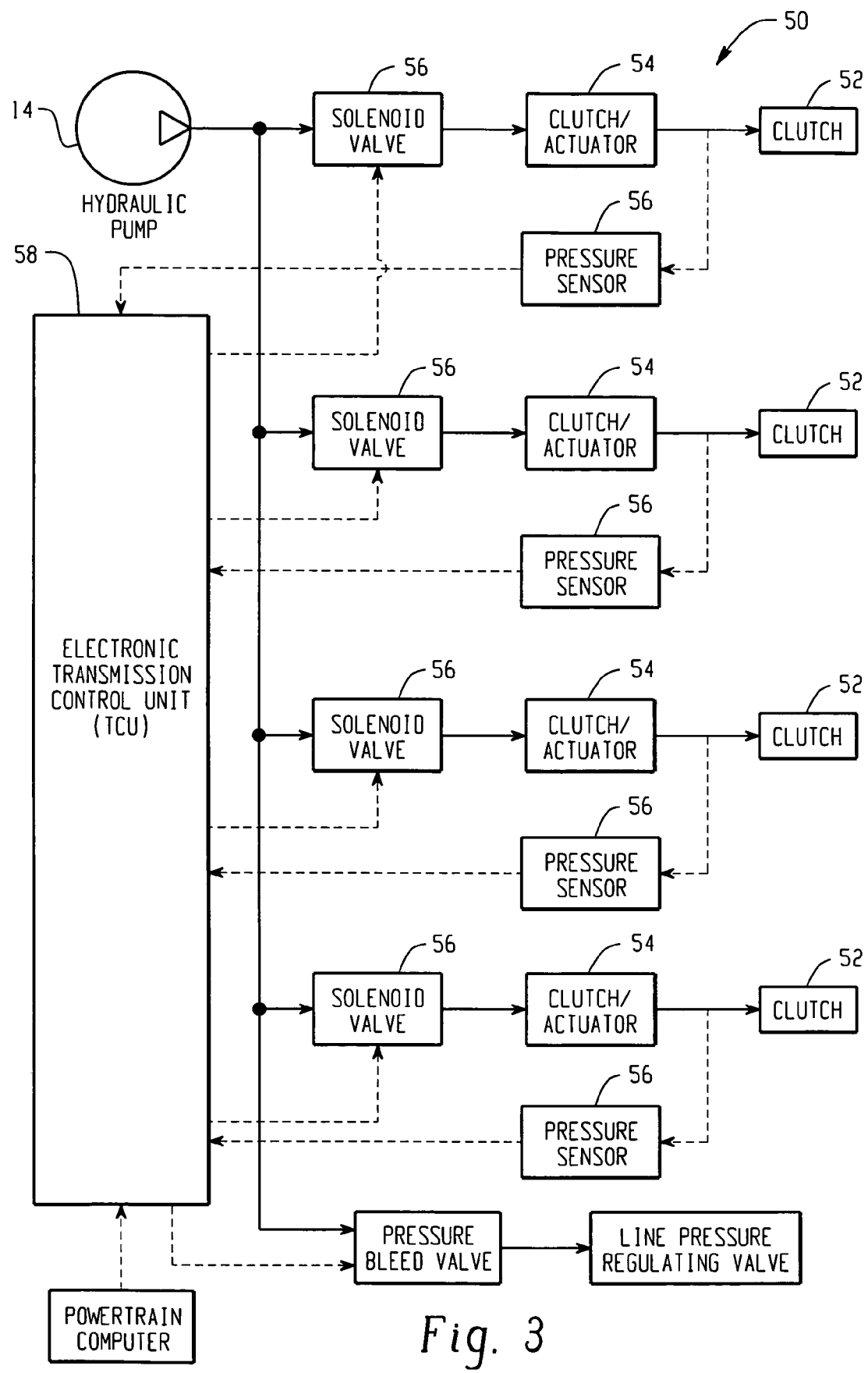
FIG. 3 is a block diagram illustrating a generic transmission system incorporating one embodiment of the invention.

FIG. 3 is a representative diagram of a transmission control system 50 incorporating the embodiment of the invention shown in FIG. 1. Note that the transmission system 50 can also incorporate the invention shown in FIG. 2. In this example, which is provided for purposes of illustration and not limitation, the transmission control system 50 includes a plurality of clutches 52 which serve as the hydraulically-actuated devices. The clutches 52 themselves can by any type of clutch, such as band clutches, multi-plate clutches, etc. The clutches 52 are controlled by clutch actuators 54, which in turn are controlled by solenoid valves 56. Each clutch 52 has an associated pressure sensor 56 that senses the pressure of the fluid supplied to the clutch 52 and sends the sensed pressure signal $P_s$ to a transmission control unit (TCU) 58. The TCU 58 also receives the command pressure signal $P_c$ from a powertrain computer 60, which corresponds to the desired pressure profile at the clutches 52. The TCU 58 then computes the differential $\Delta P = P_c - P_s$ as explained above and iteratively adjusts the current $I_E$ sent to the solenoid valves 56 so that they adjust the clutch actuators 54 until the differential $\Delta P$ approaches zero. By conducting adaptive control of the fluid pressure to the clutches 52 in real-time, the invention can adjust operation of the solenoid valves 56 to compensate for variations in the transmission system components, changes in fluid viscosity over time, component wear, etc. The adaptive control ensures that the transmission control system 50 continues to operate optimally (i.e., according to the profile indicated by the command pressure signal $P_c$) regardless of component variations and component wear over time.

Figure 4:
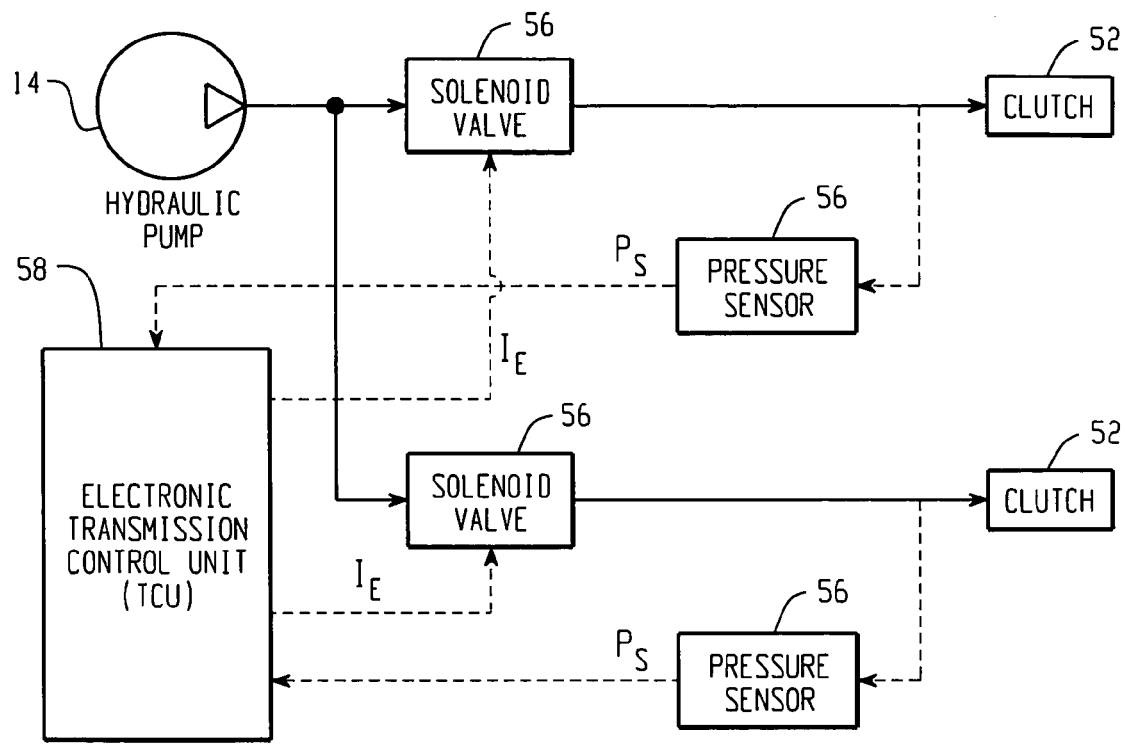
FIG. 4 is a block diagram illustrating a dual clutch transmission system incorporating one embodiment of the invention.

FIG. 4 is a representative diagram of the invention shown in FIG. 2 incorporated in a dual clutch transmission system 50 for purposes of illustration and not restriction. In this example, one clutch 52 actuates a first set of gears (e.g., gears 1, 3 and 5) and another clutch 52 actuates a second set of gears (e.g., gears 2, 4 and 6). The solenoid valve associated with each gear is adaptively controlled by the current $I_E$ output from the TCU 58 so that the sensed profile $P_s$ of the fluid pressure at the clutches 52 converges toward a desired fluid pressure profile $P_c$ as described above.

The illustrations and examples shown above in FIGS. 1 through 5 ensure that fluid pressure accuracy, and therefore system response quality, is maintained at a high level without resorting to tight internal tolerances and precision machining in the components. Further, system pressure accuracy can be controlled to precise levels even when many operational factors (e.g., engine speed, fluid temperature, hydraulic demand, etc. in the case of transmissions) need to be taken into account. Pressure drifting due to component wear and debris is also compensated for in a closed loop system because the current $I_E$ supplied to the electrically-operated control valve is automatically adjusted via the closed loop system to correct for long-term pressure drifts. In other words, the closed loop control provided by the invention is a simple, inexpensive way to provide accurate pressure control and maintain fluid pressure at target levels, even if the target levels change as a function of time.

Moreover, because the fluid pressure control is adjusted based on real-time feedback (i.e., based on the difference between a desired pressure and an actual sensed pressure), the software in the control unit can be simplified because the pressure control is based simply on the actual pressure to the clutch and not on the many underlying factors that contribute to the actual pressure; in other words, control based on actual pressure automatically takes all the underlying factors into account.

Figure 5:
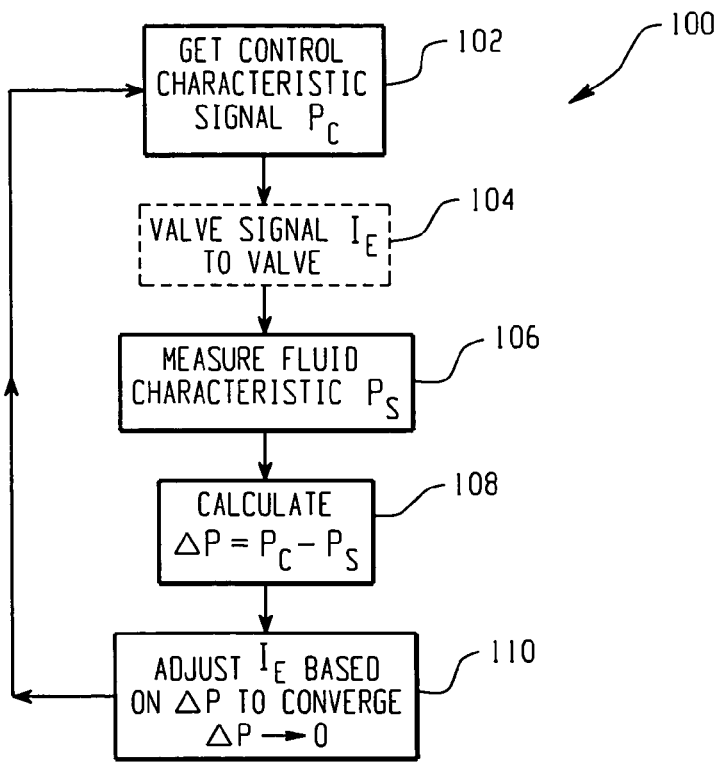
FIG. 5 is a flow diagram illustrating a closed loop adaptive fluid control method according to one embodiment of the invention.

FIG. 5 is a flow diagram illustrating a general software flow process 100 carried out by the control unit 26 to conduct closed loop control of a fluid characteristic in systems like the ones described above. In this embodiment, the control unit initially obtains the control pressure command signal $P_c$, which corresponds with a desired characteristic of the fluid pressure sent to the hydraulically-actuated device 22 (e.g., a clutch) (block 102). The control pressure command signal may be a static value or a time-varying function, depending on the desired device response and application. Also, $P_c$ may either be calculated by the control unit 26 based on inputs from various remote sensors (e.g., powertrain and chassis sensors, in the case of a TCU) or be programmed in the control unit 26. In one example, $P_c$ is recalculated based on the sensor(s) response and can change over time if the sensor(s) response changes. The key is that even though $P_c$ may change, the inventive system and method can adapt to bring the actual pressure $P_s$ toward the desired pressure $P_c$ even if the desired pressure $P_c$ is a moving target. The iterative adaptation of the actual pressure $P_s$ toward the ideal pressure $P_c$ ensures that the actual system response will stay close to the ideal response for any given condition.

During an initial iteration, the control unit 26 then sends a current or other valve signal $I_E$ corresponding to the desired pressure $P_c$ to the electrically-operated control valve 12, actuating the valve 12 (block 104). This step may be skipped in subsequent iterations because the current $I_E$ will already be adjusted in a later step based on the differential □P. In the case of systems having multiple valves, the control unit 26 sends current to them in any desired manner; they do not need to receive current simultaneously, nor do they all need to receive the same level of current $I_E$ at any given time. Instead, each control valve 12 is controlled independently depending on the desired system response and the actual fluid pressure sensed at the input of each hydraulically-actuated device 22.

Operation of the control valve 12 will cause fluid to flow to the hydraulically-actuated device 22 at a given pressure, which is measured by the pressure sensor 24 (block 106). The pressure sensor 24 then sends the sensed pressure signal $P_s$, which corresponds to the actual sensed pressure, back to the control unit 26. The control unit 26 calculates the difference □P between the sensed pressure $P_s$ and the desired pressure $P_c$ (block 108) and adjusts the current $I_E$ sent to the control valve 12 as a function of this difference □P to bring the difference □P toward zero (block 110). The process is repeated so that the system continues to adapt the amount of current $I_E$ sent to the control valve 12 during system operation and cause the actual sensed pressure $P_s$ to converge toward the desired pressure $P_c$, even if the desired pressure $P_c$ varies. Note that the step of getting the desired pressure.

By monitoring the operation of the hydraulically-actuated device in real time and conducting closed loop control of the electrically-operated, the invention improves the response time of the device. For example, if the control system is used to control shifting in a transmission system, the invention allows faster response time and limits system hysteresis better than currently known technologies. Further, providing closed loop control capabilities allows the inventive system to adapt pressure control automatically in response to anomalous or spurious inputs to the system (e.g. anomalies caused by component deterioration, environmental factors, etc.) without requiring any additional outside commands, which would be required in an open loop system. This also reduces the need for precise calibration of the electrically-operated valves because any variances in the operation of the hydraulically-actuated devices caused by variations in the electrically-operated are compensated for via the adaptive control. The real-time feedback therefore corrects for any drifting in the electrically-operated operation and/or the device operation over time.

Although the examples below focus on fluid pressure control within a transmission system, those of ordinary skill in the art will recognize that the control system of the invention, as defined by the claims, may be used in any application calling for accurate fluid characteristic monitoring and control in real time. For example, the inventive system may be used to control any hydraulic function in a vehicle powertrain, such as flow regulation to a variable displacement charge pump or ancillary systems or boosting hydraulic pressure to handle aggressive shifting.

Other possible applications include control of hydraulically-operated positioning equipment (e.g., robots, construction equipment) and systems requiring precise control over force application and/or movement (e.g., forming equipment, material dispensing, injection molding, large deflection/strain material control systems, hydraulic motion control, acceleration/deceleration control systems, etc.). Moreover, the inventive system may also be used for hydraulic pressure control in non-automotive applications.

What is claimed is:

1. A fluid control system, comprising:
   at least one electrically-operated control valve;
   a control unit that controls operation of said at least one variable control valve according to a command characteristic signal;
   at least one hydraulically-actuated device fluidically coupled to said at least one electrically-operated control valve; and
   at least one sensor that senses an actual fluid characteristic supplied to said at least one device,
   wherein said at least one sensor sends a sensed characteristic signal to the control unit, wherein the sensed characteristic signal corresponds to the actual fluid characteristic of fluid being input to said at least one hydraulically-actuated device, and wherein the control unit compares the sensed characteristic signal with a command characteristic signal and iteratively controls operation of said at least one control valve based on a difference between the sensed characteristic signal and the command characteristic signal to cause the difference to converge toward zero.

2. The system of claim 1, wherein the fluid characteristic is at least one selected from the group consisting of pressure, flow rate, accumulation time, and fill volume.

3. The system of claim 1, further comprising at least one hydraulic control valve disposed between said at least one electrically-controlled valve and said at least one device, wherein the hydraulic control valve controls operation of said at least one device.

4. The system of claim 3, wherein said at least one sensor is disposed between said at least one hydraulic control valve and said at least one device.

5. The system of claim 1, wherein the command characteristic signal is variable over time.

6. A fluid control system for a vehicle transmission, comprising:
- at least one electrically-operated valve;
- a transmission control unit that controls operation of said at least one electrically-operated valve according to a command characteristic signal;
- at least one clutch fluidically coupled to said at least one electrically-operated variable control valve; and
- at least one sensor that senses an actual fluid characteristic supplied to said at least one clutch,
- wherein said at least one sensor sends a sensed characteristic signal to the TCU, wherein the sensed characteristic signal corresponds to the actual fluid characteristic of the fluid being input to said at least one clutch, and wherein the control unit compares the sensed characteristic signal with a command characteristic signal and iteratively controls operation of sold at least one control valve based on a difference between the sensed characteristic signal and the command characteristic signal to cause the difference to converge toward zero.

7. The system of claim 6, wherein the fluid characteristic is at least one selected from the group consisting of pressure, flow rate, accumulation time, and fill volume.

8. The system of claim 6, further comprising at least one hydraulic control valve disposed between said at least one electrically-operated valve and said at least one clutch, wherein the hydraulic control valve controls operation of said at least one clutch.

9. The system of claim 8, wherein said at least one sensor is disposed between said at least one hydraulic control valve and said at least one clutch.

10. The system of claim 6, wherein said at least one electrically-operated valve is selected from the group consisting of a solenoid valve, a piezoelectric valve, and a differential valve.

11. The system of claim 6, wherein the command characteristic signal is variable over time.

12. The system of claim 6, wherein the transmission is a dual clutch transmission, wherein said at least one clutch comprises a first clutch that actuates a first set of gears and a second clutch that actuates a second of gears.

13. The system of claim 6, wherein the clutches are one selected from the group consisting of multi-plate clutches and band clutches.

14. A fluid control method for a system having at least one electrically-operated variable control valve, a control unit that controls operation of said at least one control valve according to a command characteristic signal, at least one hydraulically-actuated device fluidically coupled to said at least one electrically-operated variable control valve, and at least one sensor that senses an actual fluid characteristic supplied to said at least one device, the method comprising:
- sensing an actual fluid characteristic of fluid being sent to said at least one device;
- sending a sensed characteristic signal to the control unit, wherein the sensed characteristic signal corresponds to the actual fluid characteristic of fluid being input to said at least one hydraulically-actuated device;
- comparing the sensed characteristic signal with a command characteristic signal; and
- controlling operation of said at least one electrically-operated variable control valve based on a difference between the sensed characteristic signal and the command characteristic signal; and
- repeating the sensing, sending, comparing and controlling steps to cause the difference to converge toward zero.

15. The method of claim 14, wherein the fluid characteristic is at least one selected from the group consisting of pressure, flow rate, accumulation time, and fill volume.

16. The method of claim 14, wherein the system further comprises a hydraulic control valve disposed between the electrically-operated control valve and the device, and wherein the sensing step is conducted between the hydraulic control valve and the device.

17. The method of claim 14, further comprising varying the command characteristic signal over time, wherein the repeating step iteratively adapts to the varying command characteristic signal.

* * * * *